United States Patent [19]
Cowley et al.

[11] 3,821,206
[45] June 28, 1974

[54] CEPHALOSPORINS HAVING A POLYAZOLE SUBSTITUENT

[75] Inventors: Brian Richard Cowley, London; Gordon I. Gregory, Chalfont St. Peter; Alan G. Long, Greenford, all of England

[73] Assignee: Glaxo Laboratories Limited, Greenford, Middlesex, England

[22] Filed: Jan. 20, 1971

[21] Appl. No.: 108,189

Related U.S. Application Data

[63] Continuation of Ser. No. 688,693, Dec. 7, 1967, abandoned.

[30] Foreign Application Priority Data
Dec. 15, 1966  Great Britain ..................... 5630/66

[52] U.S. Cl. ............................. 260/243 C, 424/246

[51] Int. Cl. .......................................... C07d 99/24
[58] Field of Search ................................ 260/243 C

[56] References Cited
UNITED STATES PATENTS

| | | | |
|---|---|---|---|
| 3,360,515 | 12/1967 | Takano et al. ................... | 260/243 C |
| 3,468,874 | 9/1969 | Raab et al. ....................... | 260/243 C |

*Primary Examiner*—Nicholas S. Rizzo
*Attorney, Agent, or Firm*—Bacon & Thomas

[57] ABSTRACT

The invention is concerned with the reaction of 1,3-dipolarophiles, e.g., dicyanoacetylene, with derivatives of 7-aminocephalosporanic acid containing an azido group. The resultant compounds contain a polyazole ring substituent and are of value as antibiotics or as intermediates for the production of antibiotics.

23 Claims, No Drawings

CEPHALOSPORINS HAVING A POLYAZOLE SUBSTITUENT

This application is a continuation of copending application Ser. No. 688,693 filed on Dec. 7, 1967 and now abandoned.

This invention is concerned with improvements in or relating to antibiotics and is generally concerned with a novel reaction involving derivatives of 7-aminocephalosporanic acid (7-ACA).

In British Pat. Specification No. 1,012,943 and in Belgian Pat. No. 681,245 there is described the reaction of alkali metal azides with 7-ACA and its 7-acyl derivatives, the resulting compounds having the formula:

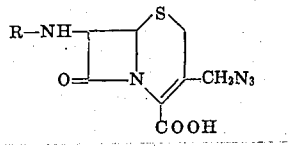

where R is an acyl group or a hydrogen atom. These compounds of formula I wherein R is an acyl group having interesting properties as antibiotics.

We have now subjected compounds of formula I to reaction with various dipolarophiles and have obtained a group of compounds wherein the azido group of formula I is replaced by a polyazole ring system. Derivatives of the type where R is an acyl group have interesting properties as antibiotics and these derivatives wherein R=H are of interest as intermediates in the preparation of antibiotics.

Moreover we have also applied the reaction to compounds of the cephalosporin series wherein the 7-acylamido group itself contains an azido group to obtain 7-acylamido-cephalosporanic acid derivatives wherein the acyl group contains a polyazole substituent. These compounds also have interesting properties as antibiotics.

An advantage of the process according to the invention is that it enables one to manufacture novel cephalosporin derivatives which cannot be made by more obvious methods, for example, direct replacement of the acyloxy, e.g., acetate, group on the exocyclic methylene group at the 3-position by a polyazole nucleophile, owing to the instability of cephalosporin compounds under the reaction conditions which would be necessary for the preparation of such compounds. Moreover the process according to the invention ensures a —C—N—linkage between the exocyclic methylene group and the polyazole nucleus. This cannot be ensured in direct reaction with a polyazole nucleophile nor can reaction with a particular nitrogen atom in the polyazole nucleus be ensured.

According to the invention, therefore, there is provided a process which comprises reacting a dipolarophile with a cephalosporanic acid derivative of the general formula:

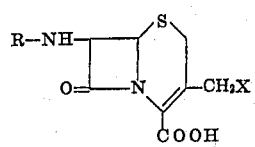

[where R is a hydrogen atom or an acyl group which may contain an azido group; and X is an acyloxy group, e.g., acetate, the residue of a nucleophile (e.g., one of those disclosed in British Pat. Specifications Nos. 912,541; 1,012,943 and 1,057,883) or hydrogen at least one of R and X providing the compound with at least one azido group] or a derivative thereof (e.g., a salt or ester thereof) to obtain a compound having at least one polyazole ring substituent whereafter, where R is a hydrogen atom, the resulting compound may be acylated.

By the expression "polyazole ring" we mean a ring having at least three nitrogen atoms in the ring.

Generally, in the process according to the invention one will use the free acid or an alkali metal salt of a compound of Formula II, since protection of the carboxyl group is not ordinarily required. However, one may use esters of the acids of Formula II, e.g., to increase the solubility of the compound in a desired reaction medium. If esters are used it is preferred to employ an ester group which can subsequently be readily split (i.e., after reaction of the azido group). Particularly suitable esters are the diphenylmethyl, stannyl and silyl esters.

Stannyl esters are formed with tetravalent tin moieties, and the stannylating agent conveniently has the formula $R^9_3SnOSnR^9_3$, $R^9_3SnOH$, $R^9_3SnOCOR^9$, $R^9_3SnOR^9$, $SnR^9_4$, or $Sn(OR^9)_4$, where $R^9$ represents a hydrocarbon group, e.g., a lower alkyl, aryl, or aralkyl group. Tri-n-butyltin oxide is particularly preferred owing to its ready availability and low toxicity; triethyltin hydroxide is also particularly useful. Triloweralkyl tin halides, e.g., tributyltin chloride, may be reacted with an alkali metal, e.g., sodium, salt of a cephalosporanic acid to provide the required stannyl ester.

Silyl esters are formed with tetravalent silicon moieties, and the silylating agent conveniently is a silazane of the formula $R^{10}_3Si.NR^{10}_2$, $R^{10}_3Si.NH.SiR^{10}_3$, $R^{10}_3Si.NH.COR^{10}$, $R^{10}_3Si.NH.CO.NH.SiR^{10}_3$, $R^{10}NH.CO.NR^{10}.SiR^{10}_3$, or $R^{10}C(OSiR^{10}_3):NSiR^{10}_3$ where the various groups $R^{10}$, which can be the same or different, represent hydrogen atoms or alkyl, aryl, or aralkyl groups. Some of these compounds may not be particularly stable under the reaction conditions where $R^{10}$ is H for all $R^{10}$ groups. It is generally preferred that the $R^{10}$ groups of the silazane should be hydrocarbon groups and preferably the hydrocarbon group should be methyl or phenyl as, for example, in hexamethyldisilazane, $(Me_3Si)_2NH$. When preparing the cephalosporanic acid derivatives on a commercial scale it may be advantageous to employ silyl chlorides such as, for example, $Me_3SiCl$, in conjunction with a weak base such as, for example, $Et_2NH$ give silylamines for example $Me_3Si.NEt_2$. The reaction can be followed by measuring the amount of volatile amine or ammonia produced if such compounds are decomposition products. Silazanes which give rise to ammonia or volatile amines are preferred because the base is volatilised under the reaction conditions, thereby avoiding $\Delta^2$ isomerisation which might otherwise occur. An inert gas is desirably passed through the reaction mixture to entrain volatile products and keep out moisture.

Silanes such as $R^{10}_3SiH$ where $R^{10}$ has the above-given meaning are not particularly suitable in this process since in general they are too reactive. Where the silylating agent is a halide, e.g., $Me_3SiCl$, causing formation of hydrogen halide during silylation, a weak base, e.g., pyridine, is desirably used as acid acceptor. Strong bases may cause isomerisation of the cephalosporin derivative to the corresponding Δ² compound.

At least 1 mole of organosilicon compound is used, preferably an excess of up to 3 moles, to effect silylation. Undiluted organosilicon compounds may be employed as the reaction medium for the silylation or an inert diluent such as a hydrocarbon e.g., benzene, toluene or a xylene, or a halogenated hydrocarbon e.g., chloroform or methylene chloride may be used.

The silyl or stannyl ester group is easily split by exposing the derivative to an excess of a compound(s) containing active hydrogen, e.g., water, acidified or basified water, alcohols, phenols, ureas, and amides.

When the cephalosporanic acid starting material contains an amino group (e.g., the 3-azidomethyl analogue of 7-ACA), esterification at the 4-position may not be advantageous since the $—NH_3^+$ function of the zwitterionic form of the acid is transformed in an ester into an $—NH_2$ group, which may undergo Michael addition to the dipolarophile.

Where the group R in Formula II is an acyl group containing an azido group the latter may be present in a straight or branched chain in the $\alpha$, $\beta$, $\gamma$, etc. position or may be present on a ring, e.g., a carbocyclic ring, as a nuclear or extranuclear substituent. Compounds of this type may be made by condensing an azidoacyl halide with a compound of Formula II wherein R is a hydrogen atom.

Whilst R (where it does not contain an azido group) may represent an acyl group in general terms one may use specific acyl groups as defined in the following general formulae. It should however be noted that these formulae are not introduced to be exhaustive.

i. $R^a(CH_2)_nCO$ — where $R^a$ is phenyl, cycloalkyl, substituted phenyl, substituted cycloalkyl or heterocyclic, particularly 5- or 6-membered monocyclic O, N or S heterocycles, and $n$ is an integer from 1–4. Examples of this group include phenylacetyl, nitrophenylacetyl, phenylpropionyl, cyclopentylacetyl, thienyl-2-acetyl, thienyl-3-acetyl and cyclohexylacetyl and those in British Patent specifications Nos. 1,082,943 and 1,082,962. These groups may also be substituted on the carbon atom $\alpha$ or $\beta$ to the 7-amido groups, for example, by amino, substituted amino (e.g., by acyl groups such as acetyl and/or lower alkyl groups), or by hydroxy, lower alkoxy or acyloxy (such as acetyloxy) groups. Examples of such substituted groups are the $\alpha$-phenyl-$\alpha$-acetoxyacetyl, $\alpha$-phenyl-$\alpha$-hydroxy acetyl and $\alpha$-phenyl-$\alpha$-formyloxyacetyl groups. ii. $C_nH_{2n+1}CO$— where $n$ is an integer from 1–7. The alkyl group may be straight or branched and if desired may be interrupted by an oxygen or a sulphur atom or substituted by one or more halogen atoms. Examples of such groups include pentanoyl, hexanoyl, heptanoyl, octanoyl, butylthioacetyl and methylthioacetyl iii. $C_nH_{2n-1}CO$ — where $n$ is an integer from 2–7. The alkenyl group may be straight or branched and, if desired, may be interrupted by an oxygen or a sulphur atom. Examples of such groups include acrylyl, crotonyl and allylthioacetyl.

iv. $R^aO.CR^bR^c.CO$ — where $R^a$ has the meaning defined under i. or is an alkyl group and $R^b$ and $R^c$ are the same or are different and each is a hydrogen atom or an alkyl, aryl or heterocyclic group. An example of such a group is phenoxyacetyl.

v. $R^aS.CR^bR^c.CO$ — where $R^a$, $R^b$ and $R^c$ are as defined above. Examples of such thio groups include S-phenylthioacetyl, S-chlorophenylthioacetyl and S-bromophenylthioacetyl.

vi. $R^a(CH_2)_mS(CH_2)_nCR^bR^c.CO$ — where $R^a$, $R^b$ and $R^c$ are as defined above, $m$ is an integer from 1–4 and $n$ is 0 or an integer from 1–4. Examples of such groups include S-benzylthioacetyl, benzylthiopropionyl and S-phenethylthioacetyl.

vii. $R^aCO$ — where $R^a$ has the meaning defined above. Examples of such groups include benzoyl, substituted benzoyl and cyclopentanecarbonyl.

viii. $R^a(C_nH_{2n-2})CO$ — where $R^a$ has the meaning defined above and $n$ is an integer of from 2–7. An example of such a group is the 3-phenyl-prop-1-enylacetyl group.

R may be any of the acyl groups disclosed in Belgian Pat. No. 681,245 certain of these fall within the above categories.

It should be noted that, if desired, R may be $\alpha$-aminoadipoly, i.e., the acyl group of cephalosporin C or any other acyl group containing an amino group, e.g., those disclosed in Belgian Pat. No. 635,137.

Dipolarophiles are substances which react with groups having a dipole which in the case of an azido group may be shown as $—N—^-N=N^+$ or $—N—^+N=N^-$. A review of dipolarophiles is to be found in Angewandte Chemie (International Ed.) 2, 1963, pp. 565–632. For the purposes of the present invention we may use dipolarophiles in general. Particular types of dipolarophiles which we have used include:

1. Acetylenic dipolarophiles

These may be shown as having the structure $R^1C \equiv CR^2$ wherein $R^1$ and $R^2$ which may be the same or different are atoms or groups. Although $R^1$ and $R^2$ may both be hydrogen, acetylene per se reacts sluggishly with azido groups; this, however, does not preclude its use, especially under pressure.

In general we prefer that $R^1$ and preferably also $R^2$ should be of an electronegative nature. Examples of such groups include cyano, $CO_2R^3$, $COR^3$ (where $R^3$ is for example, alkyl, aryl or aralkyl), and trihalomethyl e.g., trifluoromethyl.

However, $R^1$ and preferably also $R^2$ could be electropositive e.g. alkoxy or alkylamino.

$R^1$ and $R^2$ may together form a ring system with the acetylenic group such as, for example, in an aryne.

Where $R^1$ and $R^2$ are discrete atoms or groups which are identical a single compound will result; if they are different one will in general obtain a mixture of position isomers.

Of this class of dipolarophiles we particularly prefer to employ dicyanoacetylene (NC·C ≡ C·CN) or dimethyl acetylenedicarboxylate ($CH_3O·CO·C \equiv C·CO·OCH_3$) especially when using cephalosporin compounds wherein X in formula II above is an azido group. The resulting triazoles may be depicted as having the structure:

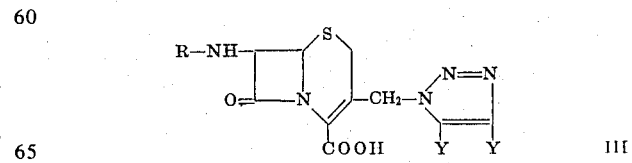

III (where R is an acyl group or a hydrogen atom, and the groups Y, which are the same, are cyano or methoxycarbonyl groups), esters thereof, and salts thereof with non-toxic cations and acid addition salts e.g., with strong acids.

Compounds of formula III wherein R is an acyl group have interesting antibiotic properties and in particular have generally favourable activity against gram negative organisms as well as possessing resistance to attack by staphylococcal penicillinase.

Compounds of this type which are of particular importance are

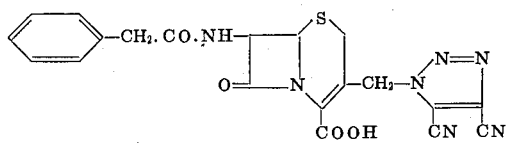

i.e., 1-(4'-carboxy-7'-phenylacetamidoceph-3'-em-3'-ylmethyl)- 4,5-dicyano-1,2,3-triazole;

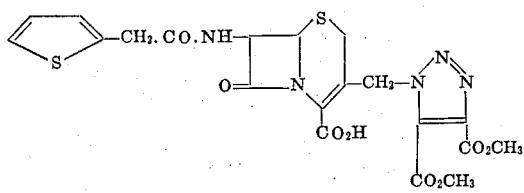

i.e., 1-[4'-carboxy-7'-(2''-thienylacetamido)-ceph-3'-em-3'-ylmethyl]-4,5-dimethoxycarbonyl-1,2,3-triazole;

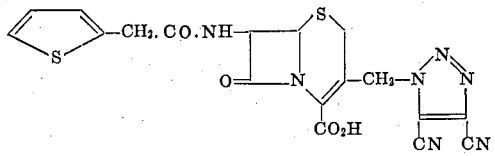

i.e., 1-[4'-carboxy-7'-(2''-thienylacetamido)-ceph-3'-em-3'-ylmethyl]-4,5-dicyano-1,2,3-triazole; and salts of these compounds, especially their alkali metal, e.g., sodium, salts, and acid addition salts.

These compounds have shown good activity in vitro against a range of gram-positive organisms including penicillin-resistant Staphlococci and also against a variety of gram negative organisms.

A compound of particular importance derived from a compound of the formula II in which R contains an azido group is

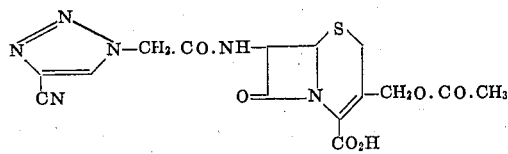

i.e., 3-acetoxymethyl 7-(4'-cyano-1', 2', 3'-triazol-1'-ylacetamido)ceph-3-em-4-carboxylic acid, and its salts, especially its alkali metal, e.g., sodium salts, and acid addition salts. 3-Acetoxymethyl 7-(4'-cyano-1', 2', 3'-triazol-1'-ylacetamido)ceph-3-em-4-carboxylic acid has also shown good activity in vitro against a range of grampositive organisms including penicillin-resistant Staphylococci and also against a variety of gram-negative organisms.

Ethylenic dipolarophiles

These may be shown as having the structure $R^5 \cdot R^6 C = CR^7 \cdot R^8$ where $R^5$, $R^6$, $R^7$ and $R^8$ which may be the same or different are atoms or groups. Although $R^5$, $R^6$, $R^7$ and $R^8$ may all be hydrogen, ethylene per se, like acetylene, reacts sluggishly with azido groups. Preferably $R^5$ and $R^7$ together form a cyclic structure, e.g., a carbocyclic structure, with the ethenoid group such that the double bond is strained. Examples of ethylenic dipolarophiles containing strained double bonds include norbornenes, transcycloalkenes and acenaphthalene.

Further ethylenic dipolarophiles which may be used include compounds of the formula $R^5 \cdot R^6 \cdot C = CR^7 \cdot R^8$ where at least one of $R^5$, $R^6$, $R^7$ and $R^8$ is an electronegative group. $R^5$ and $R^7$ may thus be identical electronegative groups, $R^6$ and $R^8$ being other groups as desired. $R^6$ and $R^8$ may thus together form a ring system.

Examples of such dipolarophiles include benzoquinone and nuclear substituted benzoquinones and maleimide. Again all of $R^5$, $R^6$, $R^7$ and $R^8$ may be identical electronegative groups. Electronegative groups which may be used include those listed under the section on acetylenic dipolarphiles and examples of such compounds thus include dicyanoethylene and lower mono- and di-alkoxycarbonyl ethylenes.

One or more of $R^5$, $R^6$, $R^7$ and $R^8$ may if desired be electropositive.

When ethylenic dipolarophiles react with azide groups in the situations described herein, the products may be mixtures of positional isomers and/or diastereoisomers. Thus when $R^5$ is the same as $R^6$, and $R^7$ and $R^8$ are the same, but different from $R^5$ and $R^6$, two position isomers can theoretically be produced. When $R^5$ is the same as $R^7$ and $R^6$ and $R^8$ are the same, but different from $R^5$ and $R^7$, two steroisomers can theoretically be produced, whether the ethylenic dipolarophile is the cis or trans form. If the substituents in the ethylenic dipolarophile are unsymmetrically disposed, the products may contain further isomers, predicted on the grounds considered above for simpler dipolarophiles.

Reaction with cyclic dipolarophiles, e.g., maleic anhydride and maleimide and their derivatives, may produce mixtures of products having cis- and trans-fused bicyclic systems.

3. Cyano dipolarophiles

Although certain of the dipolarophiles referred to above contain cyano groups the principal dipolarophile of the compound is the carbon-carbon moiety of the acetylenic or ethylenic compound. However where such moieties are not present, cyano compounds, especially those which are activated by electronegative groups, function as dipolarophiles. Examples of such dipolarophiles include lower alkoxy carbonyl cyanides and cyanogen.

The resulting compounds have the structure:

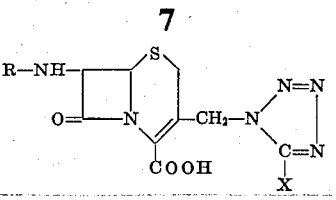

when X·CN is the cyano dipolarophile reacted with a 3-azidomethyl compound.

It should be noted that in some cases the product obtained by reaction of the dipolarophile reacted with a 3-azidomethyl compound with the cephalosporanic acid derivative is itself a dipolarophile. In such cases it is possible that the product will undergo a further reaction with the cephalosporanic acid derivative however, this eventuality is precluded by using equimolar proportions of dipolarophile and cephalosporanic acid derivative.

Reaction Conditions

The reaction between the azide and the dipolarophile is generally effected in solution in an organic solvent. If the dipolarophile is itself a solvent it may not be necessary to use a further solvent. The solvent is preferably an aprotic solvent. Solvents of this type include cyclic and acyclic ethers e.g., dioxan, tetrahydrofuran and diethyl ether, hydrocarbons e.g., benzene and toluene, halogenated hydrocarbons e.g., chloroform and methylene chloride and esters e.g., ethylacetate. However protic solvents e.g., lower alkanols, may be used if the reactants are sufficiently soluble therein.

The reaction may be effected at a temperature in the range of 15° to 150°C preferably from 20° to 120°C. In some instances the upper temperature limit will depend on the boiling point of the solvent.

The course of the reaction may be followed by one or more of the following signs: migration of reagents and products on thin layer and paper chromatograms and electrophoretograms (especially if new basic centres are introduced); loss of the absorption, $\nu_{max}$. ca 2120 cm$^{-1}$, due to the azido group; development of absorption spectra attributable to the products (for instance, triazolines add to the absorption of the ceph-3-em-system at 260–280 m$\mu$).

With some reactants the reaction and/or isolation is accompanied by evolution of nitrogen. Alternatively, nitrogen may be eliminated from the reaction product in a further stage. Thus for example, a triazoline (the reaction product of an ethylenic dipolarophile and the azide) can be heated, reacted with acid or photolysed to eliminate nitrogen. We have used the reaction of an acid with a triazoline having an esterified carboxyl group in the 4-position of the cephem nucleus to prepare lactams of 3-acetoxymethyl-7-acylamidoceph-3-em4-carboxylic acid (vide Example 26b).

Recovery of Derivative

The derivative formed may be recovered by an convenient procedure according to the properties of the compound. Generally the derivatives will be isolated by extraction with an inert organic solvent and thereafter purified by crystallisation.

The compounds obtained according to the invention are novel and may be defined as 7-acylamido-3-methyl (or 3-substituted methyl)ceph-3-em-4-carboxylic acids having an N-linked polyazole substituent on the acylamido group at the 7-position and/or on the methyl group at the 3-position and derivatives thereof. Compounds of this type include 1-(7'-acylamido-4'-carboxyceph-3'-em-3'-ylmethyl)-1,2,3-triazoles and -1,2,3-triazolines and 3-acyloxymethyl-7-(1',2',3'3'-triazol-1'-ylacetamido and 1',2',3'-triazolin-1'-ylacetamido)ceph-3-em-4-carboxylic acids and derivatives thereof e.g., esters and salts including salts with alkali metal and alkaline earth metals as well as salts with organic bases.

The compounds according to the invention may be formulated for administration in any convenient way by analogy with other antibiotic substances, such as penicillin and neomycin, and the invention thus includes within its scope pharmaceutical compositions comprising a compound of general formula (II), where R is an acyl group, adapted for use in human or veterinary medicine. Such compositions may be presented for use in conventional manner with the aid of any necessary or desirable pharmaceutical carriers or excipients.

The compounds may thus take the form of injections either as solutions or suspensions in physiologically acceptable media, or as dry products for reconstitution in such media before use. The compounds may also be formulated for oral use as tablets, capsules, liquid preparations etc., or for rectal use in suppository form. For topical use the compositions may take the form of conventional creams, ointments, lotions, sprays etc.

For veterinary medicine the compounds may be formulated in a manner conventional in that field, unit dose intramammary injections being a particularly useful form. Other forms may include quick acting and/or prolonged action systemic injections; preparations for oral administration such as tablets, drenches, or feed additives and compositions for topical use such as creams, ointments, lotions, washes etc.

In general the dosages employed in human medicine for adults will range from 200 mg. per dose upwards, administered for example four times a day.

The compounds according to the invention may be administered in combination with other medicinal agents in particular additional antibiotics such as other cephalosporins, tetracyclines or penicillins.

In order that the invention may be well understood the following examples are given by way of illustration only.

In the examples paper chromatography was carried out at 37° with descending eluants and with Whatman No. 1 papers buffered with 0.1M sodium acetate (at pH 5.0); the system was ethyl acetate (8), n-butanol (1), 0.1M sodium acetate (pH 5.0) (8), the upper phase being used for development of the chromatogram. The spots were located by viewing the dried paper under ultraviolet light. The results are quoted as $R_f$ values.

Thin layer chromatography (t.l.c.) was carried out on Kieselgel G, with methylene chloride-acetone (96:4), unless otherwise stated.

EXAMPLES 1 – 4

Addition of acetylenes to esters of 3-azidomethyl-7-phenyl-acetamidoceph3-em-4-carboxylic acid

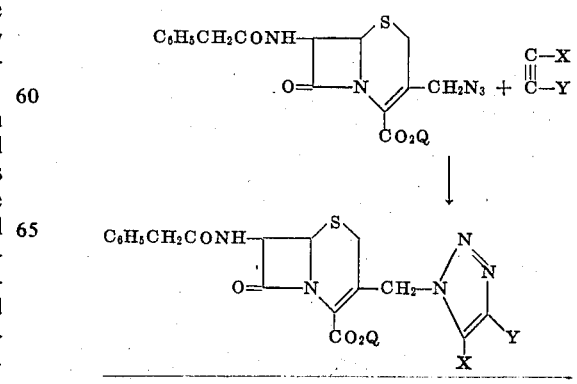

Example 1 (X = Y = CO₂CH₃; Q = CH₃)

A mixture of 3-azidomethyl-4-methoxycarbonyl-7-phenylacetamidoceph-3-em (0.78 g., 2 mmole.), dimethyl acetylenedicarboxylate (0.28 g., 2 mmole.) and toluene (20 ml.) was heated at 98° for 1 hour. The solvent was removed and residue was crystallised from acetone to give colourless crystals (0.24 g.). A further crystallisation from aqueous acetone gave 4,5-dimethoxycarbonyl-1-(4'-methoxycarbonyl-7'-phenylacetamidoceph-3'-em-3'-ylmethyl)-1,2,3-triazole (0.17 g., 16%). Evaporation of the filtrates and crystallisation of the combined residues from aqueous acetone gave a less pure second crop (0.52 g., 49%), m.p. 145°–149°.

The results of this and further examples carried out similarly are summarized in Table 1.

EXAMPLES 5 – 17

Addition of dimethyl acetylene-dicarboxylate to various 3-azidomethyl-7-acylamidoceph-3-em-4-carboxylic acids

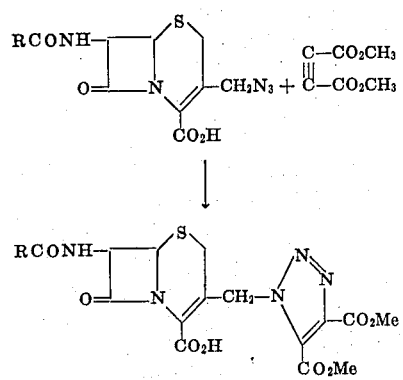

Example 5 (R = C₆H₅CH₂)

Dimethyl acetylenedicarboxylate (0.71 g., 5 mmole.) was added to a solution of 3-azidomethyl-7-phenylacetamidoceph-3-em-4-carboxylic acid (1.87 g., 5 mmole.) in dioxan (20 ml.). The mixture was heated for 4 hours at 98° and evaporated to an orange solid which was twice crystallised from ethanol to give the colourless 1-(4'-carboxy-7'-phenylacetamidoceph-3'-em-3'-ylmethyl)-4,5-dimethoxycarbonyl-1,2,3-triazole (1.40 g., 54%).

Example 9 (R = C₆H₅·CH₂·CH:CH·CH₂)

Dimethyl acetylenedicarboxylate (0.27 g., 1.84 mmole.) was added to a solution of 3-azidomethyl-7-(5'-phenylpent-3'-enamido)ceph-3-em-4-carboxylic acid (0.76 g., 1.84 mmole.) in dioxan (6 ml.). The mixture was heated at 98° for 4 hr. and evaporated, and the residue was dissolved in ethyl acetate (15 ml.). A 10 percent solution of sodium 2-ethylhexanoate in n-butanol (3 ml.) was added and the precipitated buff solid was filtered off, dried and crystallised from aqueous acetone to give sodium 1-(4'-carboxy-7'-[5''-phenylpent-3''-enamido]-ceph-3'-em-3'-ylmethyl)-4,5-dimethoxycarbonyl-1,2,3-triazole (0.41 g., 39%), as an off-white solid.

The results of Examples 5 and 9 and other Examples carried out similarly, are summarized in Table 2.

TABLE 1

| Example | Starting Materials | | | | | | Solvent | Temp. °C | Time (hr.) | Product | | | | | | | | | | | | |
|---|---|---|---|---|---|---|---|---|---|---|---|---|---|---|---|---|---|---|---|---|---|---|
| | Azide | | Acetylene | | | | | | | [α]$_D$ 1% in dioxan | UV in ethanol | | M.p. | Yield in % | | Found | | | | Empirical Formula | Required | |
| | Q | Mmole | X | Y | Mmole | | | | | | λ max mµ | ε | | Crude | Cryst | C | H | N | S | | C H N | S |
| 1 | CH₃ | 2 | CO₂CH₃ | CO₂CH₃ | 2 | | Toluene | 98 | 1 | +78° | *250 | 9,600 | 145–49° | | †65 | 52.4 | 4.3 | 13.5 | 5.9 | C₂₃H₂₃N₅O₉S | 52.2 4.4 13.2 | 6.1 |
| 2 | CH₃ | 0.5 | COC₆H₅ | CO₂CH₃ | 0.5 | | Toluene | 108 | 20 | | 265–66 | 32,300 | | 56 | 26 | 64.2 | 4.3 | 11.5 | 5.2 | C₂₈H₂₇N₅O₈S | 63.8 4.4 11.3 | 5.2 |
| 3 | C₆H₅CH₂ | 1 | CO₂CH₃ | CO₂CH₃ | 1 | | Toluene | 98 | 1 | +55° | *250 | 9,700 | 159–162° | | †47 | 57.4 | 4.6 | 12.0 | 5.0 | C₂₉H₂₅N₅O₉S | 57.5 4.5 11.6 | 5.3 |
| 4 | CH₃ | 5 | H | CN | 5.15/3.6 | | Dioxan | 25/37 | 66/62 | +8° | 264 | 8,100 | | | †53 | 54.7 | 4.5 | 18.9 | 7.0 | C₂₀H₁₉N₆O₆S | 54.8 4.1 19.2 | 7.3 |

* Inflexion.
† Two crops combined.

TABLE 2

| Examples | Starting material R | Mmole | Yield in percent Crude | Yield in percent Cryst. | [α]b 1% in water | Solvent | UV λmax mµ | ε | Rf | Product Found C | Product Found H | Product Found N | Product Found S | Empirical formula | Required C | Required H | Required N | Required S |
|---|---|---|---|---|---|---|---|---|---|---|---|---|---|---|---|---|---|---|
| 5 | C₆H₅—CH₂— | 5 | 75 | 54 | ¹+74° | pH 6 | 250 | 11,750 | 0.17 | 51.1 | 4.2 | 13.2 | 5.9 | C₂₂H₂₁N₅O₈S | 51.25 | 4.1 | 13.6 | 6.2 |
| 6 | 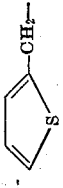 | 1.7 | 74 | 37 | +92° | pH 6 | 234-35 | 20,300 | 0.19 | 43.6 | 3.45 | 12.5 | 11.1 | C₂₀H₁₈N₄NaO₈S₂·½H₂O | 43.5 | 3.5 | 12.7 | 11.6 |
| 7 | CH₃CH₂CH₂CH₂— | 3 | 91 | 58 | +95° | pH 6 | ²240 | 12,500 | 0.18 | 44.95 | 4.2 | 14.0 | 6.1 | C₁₉H₂₂N₄NaO₈S | 45.4 | 4.4 | 13.9 | 6.4 |
| 8 | CH₃CH₂SCH₂— | 3 | 84 | 43 | +61° | Water | ²240 | 12,050 | 0.41 | 47.4 | 2.8 | 11.9 | 10.5 | C₁₈H₂₂N₄NaO₈S₂ | 47.3 | 3.8 | 12.0 | 11.0 |
| 9 | C₆H₅CH₂CH·CHCH₂— | 1.84 | 61 | 39 | +64° | do | 250 | 12,500 | | 51.8 | 4.4 | 12.1 | 5.4 | C₂₅H₂₄N₄NaO₈S | 52.0 | 4.2 | 12.1 | 5.55 |
| 10 | D— C₆H₅CH(OAc)— | 10 | 83 | 19 | ¹+26° | pH 6 | ²244 | 11,200 | 0.39 | 50.2 | 4.2 | 11.6 | 5.2 | C₂₄H₂₅N₅O₁₀S | 50.25 | 4.0 | 12.2 | 5.6 |
| 11 | D— C₆H₅CH(OH)— | 12.5 | 76 | | | pH 6 | ²251 | 9,900 | 0.09 | | | | | | | | | |
| 12 | CH₃SCH₂— | 7.1 | 72 | 34 | ¹+72° | pH 6 | ²250 | 10,750 | 0.05 | | | | | | | | | |
| 13 | D— C₆H₅CH(O·CHO)— | 10 | 86 | 18 | ¹+25° | pH 6 | ²249 | 12,500 | | | | | | | | | | |
| 14 | 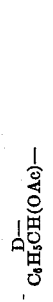 | 10 | 79 | 26 | ¹+79° | Ethanol | 261 271 | 9,860 8,850 | 0.23 | 49.6 | 3.7 | 12.8 | 5.9 | C₂₂H₂₀FN₅O₈S | 49.5 | 3.8 | 13.1 | 6.0 |
| 15 |  | 26 | | 56 | ¹+81° | pH 6 | 260 ²266 | 11,500 10,200 | 0.21 | 48.9 | 3.8 | 13.2 | 5.9 | C₂₂H₂₀FN₅O₈S | 49.5 | 3.8 | 13.1 | 6.0 |
| 16 |  | 10 | 42 | 11 | ¹+86° | pH 6 | 254 ²264 | 11,200 9,910 | 0.19 | 49.1 | 3.7 | 12.5 | 6.1 | C₂₂H₂₀FN₅O₈S | 49.5 | 3.8 | 13.1 | 6.0 |
| 17 |  | 10 | 95 | 32 | ¹+71° | pH 6 | ²250 | 11,600 | 0.25 | 50.2 | 4.0 | 12.0 | 5.4 | C₂₄H₂₃N₅O₁₀S | 50.2 | 4.0 | 12.2 | 5.6 |

¹ 1% solution in dioxan.  ² Inflexion.
NOTE.—Examples 10–14 all purified via dicyclohexylamine salts.

EXAMPLES 18 - 21

Addition of various acetylenes to 3-azidomethyl-7-phenylacetamidoceph-3-em-4-carboxylic acid

Example 18

Dibenzoylacetylene (1.17 g., 5 mmole.) was added to a solution of 3-azidomethyl-7-phenylacetamidoceph-3-em-4-carboxylic acid (1.87 g., 5 mmole.) in dioxan (20 ml.). The mixture was heated at 98° for 16 hr. and then evaporated, and the residual brown foam was dissolved in ethyl acetate. Extraction with saturated aqueous sodium hydrogen carbonate solution (3 × 50 and 1 × 25 ml.) gave on acidification an amber gum (0.31 g.) which showed on paper chromatography six spots with ultraviolet absorption. Subsequent extraction with water (3 × 100 ml.) gave, on acidification and extraction with ethyl acetate, a pale brown solid (2.38 g.), $R_f$ 0.41, 0.90 (weak), which was dissolved in acetone (25 ml.). A 10%-solution of sodium 2-ethylhexanoate in n-butanol (10 ml.) was added and the mixture was evaporated until a buff solid separated. This solid was filtered off, washed with cold acetone-ether (2:1), dried (2.10 g., 67%), and suspended in boiling acetone (75 ml.), and water was added until the solid just dissolved. After partial cooling and addition of ether (75 ml.), a white crystalline solid separated on standing at 0°. This solid was filtered off, washed with acetone and dried to give sodium 1-(4'-carobxy-7'-phenylacetamidoceph-3'-em-3'-ylmethyl)-4,5-dibenzoyl-1,2,3-triazole (1.39 g., 43%), $[\alpha]_D^{23} + 133°$ (C, 0.87; dimethylsulphoxide), $\lambda_{max.}(H_2O)$ 267–268 m$\mu$ ($\epsilon$ 33,000) (Found: C, 59.3; H, 4.13; N, 10.65; S, 4.8. $C_{32}H_{24}N_5NaO_6S \cdot H_2O$ requires C, 59.3; H, 4.05; N, 10.8; S, 4.95%), $R_f$ 0.48.

Example 19

A solution of 3-azidomethyl-7-phenylacetamidoceph-3-em-4-carboxylic acid (2.05 g., 5.5 mmole.) in dioxan (5 ml.) was added to cyanoacetylene (0.29 g., 6.5 mmole.), and the mixture was stored in the dark under nitrogen for 67 hr. at 20°. A further equivalent (0.28 g.) of cyanoacetylene was added and the mixture was incubated for a further 40 hr. at 37° and then evaporated. The residual foam was dissolved in ethyl acetate (100 ml.), and the solution extracted with saturated aqueous sodium hydrogen carbonate solution (1 × 50 and 2 × 25 ml.). The alkaline extract was washed with ethyl acetate (100 ml.), acidified to pH 2.0, and extracted with ethyl acetate (3 × 100 ml.). Evaporation of this extract gave a yellow foam (2.24 g.) which was crystallised from ethanol-water (3:2; 25 ml.) to give a white solid (1.23 g., 53%). Recrystallisation from ethanol (13 ml.) gave 1-(4'-carboxy-7'-phenylacetamidoceph-3'-em-3'-ylmethyl)-4-cyano-1,2,3-triazole (0.71 g., 30%), m.p. 175°–179°, $[\alpha]_D^{23} \pm 0°$ (C 0.9; dioxan), $\lambda_{max.}(H_2O;$ pH6) 259 m$\mu$ ($\epsilon$ 9,850) (Found: C, 53.75; H, 3.9; N, 18.95; S, 7.3. $C_{1.9}H_{16}N_6O_4S$. $1/6 C_2H_5OH$ requires C, 53.7; H, 4.0; N, 19.45; S, 7.4%). A determination of its proton magnetic resonance (p.m.r.) spectrum in $D_2O$ indicated that the product contained ~1/6 mole of ethanol.

Example 20

Ethyl propiolate (0.74 g., 7.5 mmole.) was added to a solution of 3-azidomethyl-7-phenylacetamidoceph-3-em-4-carboxylic acid (1.87 g., 5 mmole.), and the mixture was heated for 6.5 hr. at 98°, and evaporated. The residue was dissolved in ethyl acetate (100 ml.), and the solution was extracted with saturated aqueous sodium hydrogen carbonate solution (1 × 50 and 2 × 25 ml.). The alkaline extract was washed with ethyl acetate (50 ml.), acidified to pH 2.0, and extracted with ethyl acetate (3 × 100 ml.). Evaporation of this extract gave a foam (2.14 g.), which was dissolved in acetone (15 ml.). A 10 percent solution of sodium 2-ethylhexanoate in acetone (10 ml.) and then ether (75 ml.) were added, and the off-white precipitate was centrifuged off, washed with ether, dried (1.90 g., 81%), and crystallised from aqueous acetone to give an off-white solid (0.49 g., 21%), $[\alpha]_D^{23} + 96°$ (C 0.90; dimethylsulphoxide), $\lambda_{max.}$ ($H_2O$; pH6) 257–258 m$\mu$ ($\epsilon$ 9,950) (Found: C, 50.2; H, 4.2; N, 13.6; S, 6.2. $C_{21}H_{20}N_5NaO_6S$. ½$H_2O$ requires C, 50.2; H, 4.2; N, 13.9; S, 6.4%), $R_f$ 0.16 (weak), 0.22 and 0.29. A determination of the p.m.r. spectrum of the product indicated it to be a 50:50-mixture of sodium 1-(4'-carboxy-7'-phenylacetamidoceph-3'-em-3'-ylmethyl)-4-and -5-ethoxycarbonyl-1,2,3-triazoles, together with about 3 percent sodium 3-acetoxymethyl 7-phenylacetamidoceph-3-em-4-carboxylate.

Example 21

A solution of 3-azidomethyl-7-phenylacetamidoceph-3-em-4-carboxylic acid (2.98 g., 8 mmole.) in dioxan (ca. 10 ml.) was added to dicyanoacetylene (0.61 g., 8.06 mmole.), and the mixture was kept in the dark for 43 hr. at 37°. The dioxan was removed and the residue was dissolved in ethyl acetate (25 ml.). The solution was stirred for 10 min. with a little charcoal, filtered, and extracted with saturated aqueous sodium hydrogen carbonate solution (1 × 50 and 2 × 25 ml.). Acidification of the alkaline extract gave a brown foam (1.31 g.), which was converted into its sodium salt (1.07 g.), obtained as two fractions both containing sodium 3-acetoxymethyl-7-phenylacetamidoceph-3-em-4-carboxylate (ca. 15%). Subsequent extraction of the ethyl acetate solution with water (3 × 100 ml.) gave, on acidification and extraction with ethyl acetate, a brown foam (2.08 g.). This foam (2.03 g.) was dissolved in dioxan (30 ml.) and a solution of diphenyldiazomethane (ca. 4.5 mmole.) in petroleum ether (b.p. 40°–60°, 18 ml.) was added slowly, with swirling. The mixture was allowed to stand overnight at 20° and then evaporated. The residue was dissolved in ethyl acetate and the solution was washed with 2N-hydrochloric acid, water, saturated aqueous sodium bicarbonate and water, dried and evaporated to give the crude diphenylmethyl ester as a brown foam (2.46 g.). The ester was purified by dry-column chromatography (B. Loev and K. M. Snader, Chem. and Ind., 1965, 15) on silica gel (200 g.; deactivated by addition of 3%-water), with methylene chloride-acetone (98:2) to develop and elute the column. The appropriate fractions of the eluate (as determined by t.l.c.) were combined and evaporated, and the residual yellow foam (1.37 g.) was dissolved in anisole (2.5 ml.). Trifluoroacetic acid (8 ml.) was added, and after 4 min. swirling, the mixture was evaporated at 20°/1mm. The residue was dissolved in ethyl acetate and this solution was extracted with saturated aqueous sodium hydrogen carbonate solution (x2) and water (x3). The alkaline and aqueous extracts were combined, acidified to pH 1.5, and extracted with ethyl acetate (x3). The combined ethyl acetate extract was washed with 10%-aqueous sodium chloride solution, dried, and evaporated. The residue (1.19 g.) was dissolved in acetone and a 10%-solution of sodium 2-ethylhexanoate in acetone (6.5 ml.) was added. Dilution with ether (> 5 volumes) gave a white precipitate which was centrifuged off, washed with ether, dried (1.04 g.), and reprecipitated from acetone with ether to give sodium 1-(4'-carboxy-7'-phenylacetamidoceph-3'-em-3'-ylmethyl)-4,5-dicyano-1,2,3-triazole (0.89 g., 34%), $[\alpha]_D^{23} + 122°$ (C 1.07; water), $\lambda_{max}.(H_2O; pH6)$ 230 m$\mu$ ($\epsilon$ 14,000) and 260 m$\mu$ ($\epsilon$ 10,350) (Found: C, 45.8, 46.3; H, 2.9; N, 18.0, 17.75; S, 6.05. $C_{20}H_{14}N_7NaO_4S. 3H_2O$ requires C, 45.7; H, 3.8; N, 18.7; S, 6.1%), $R_f$ 0.40.

Example 22

Sodium 1-(4'-carboxy-7'-2''-thienylacetamidoceph-3'-em-3'-ylmethyl)-4,5-dicyano-1,2,3-triazole A solution of 3-azidomethyl-7-(2'-thienylacetamido)ceph-3-em-4-carboxylic acid (7.59 g., 20 mmole.) in dioxan (120 ml.) was treated with a solution of diphenyldiazomethane ($\not<$ 20 mmole.) in petroleum ether (b.p. 40°-60°; 40 ml.). The mixture was kept at 20° for 64 hr., and then evaporated. The residue was dissolved in ethyl acetate and the solution was washed with 2N-hydrochloric acid, water, saturated aqueous sodium hydrogen carbonate solution and water, dried and evaporated to an orange glass (11.8 g.). This was dissolved in methylene chloride (50 ml.), and the solution was chromatographed on silica gel (1 kg.). Methylene chloride-acetone (96:4) eluted a yellow solid which was triturated with cold acetone to give cream crystals of 3-azidomethyl-4-diphenylmethoxycarbonyl-7-(2'-thienylacetamido)-ceph-3-em (7.02 g.), m.p. 153°-156°, $[\alpha]_D^{25} + 6°$ (C 1.06; dioxan), $\lambda_{max}.$(EtOH) 260 m$\mu$ ($E_{1cm}^{1\%}$ 139), t.l.c. $R_f$ 0.49.

A solution of the diphenylmethylester (3.82 g.) in dioxan (25 ml.) was added to a solution of dicyanoacetylene (ca. 7.9 mmole.) in dioxan (6 ml.). The reddish-black mixture was kept for 64 hr. at 37° in a sealed tube in the dark, when the infrared spectrum of a sample showed ca. 10 percent of the azide remaining. The mixture was heated on a steam bath for 45 min. (5 percent azide still remaining) and evaporated. The residual foam, t.l.c. 0.0 (weak), 0.37, 0.50, was dissolved in methylene chloride (20 ml.), and the solution was chromatographed on silica gel (500 g.). Methylene chloride-acetone (96:4) eluted 4,5-dicyano-1-(4'-diphenylmethoxycarbonyl-7'-[2''-thienylacetamido]-ceph-3'-em-3'-ylmethyl)-1,2,3-triazole as a pale brown foam (3.25 g.), $\lambda$ (EtOH; inflexion) 260 m$\mu$ ($E_{1cm}^{1\%}$ 145) t.l.c. $R_f$ 0.58.

The dicyanotriazole diphenylmethyl ester (3.18 g.) was dissolved in anisole (5 ml.), and trifluoroacetic acid (20 ml.) was added with swirling. After 4 min. the volatile material was evaporated at 20°/1 mm, and the residual green gum was dissolved in ethyl acetate (50 ml.). This solution was extracted with saturated aqueous sodium hydrogen carbonate solution (2 × 50 ml.) and aqueous sodium chloride solution (2 × 50 ml.). The alkaline and aqueous extracts were combined, back-washed with ethyl acetate (25 ml.), acidified to pH 2.0 with concentrated hydrochloric acid, and extracted with ethyl acetate (2 × 100 and 1 × 50 ml.). The ethyl acetate extract was washed with aqueous sodium chloride solution (2 × 50 ml.), dried and evaporated to give a yellow foam (1.74 g.). This foam was dissolved in acetone (20 ml.) and a 10%-solution of sodium 2-ethylhexanoate in acetone (10 ml.) was added. The clear solution was filtered and diluted with ether (200 ml.), and the mixture stored at 0° for 2 hr. The cream precipitate was centrifuged off, washed with ether-acetone (5:1; 2 × 50 ml.), dried, ground in a mortar and redried at 40°/1 mm. to give sodium 1-(4'-carboxyl-7'-[2''-thienylacetamido]-ceph-3'-em-3'-ylmethyl)-4,5-dicyano-1,2,3-triazole as a cream powder (1.26 g., 24.7%), $[\alpha]_D^{27} + 111°$ (C 0.95; $H_2O$), $\lambda_{max}.(H_2O; pH6)$ 235 m$\mu$ ($E_{1cm}^{1\%}$ 394).

Examples 23 & 24

Addition of acetylenes to 3-acetoxymethyl-7-azidoacetamidoceph-3-em-4-carboxylic acid

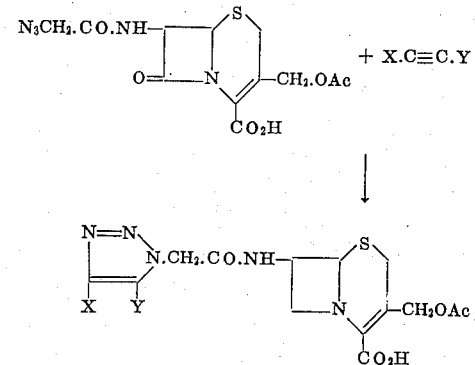

Example = (X=Y =CO$_2$Me)

Dimethyl acetylenedicarboxylate (87 mg., 0.61 mmole.) was added to a solution of 3-acetoxymethyl-7-azidoacetamidoceph-3-em-4-carboxylic acid (190 mg., 0.45 mmole.) in dioxan (2 ml.), and the mixture was heated for 2 hr. at 98° and evaporated. The residual yellow foam was dissolved in acetone, and the solution was treated with a 10%-solution of sodium 2-ethylhexanoate in acetone (1.5 ml.). Addition of ether precipitated a purple-brown solid which was centrifuged off, washed with ether, dried (224 mg.), and reprecipitated from acetone with ether to give sodium 3-acetoxymethyl-7-(4',5'-dimethoxycarbonyl-1',2',3'-triazol-1'-ylacetamido)-ceph-3-em-4-carboxylate (152 mg., 52%), $\lambda_{max}.(H_2O, pH6)$ 229-231 m$\mu$ ($\epsilon$ 15,400) (Found: C, 39.5; H, 4.0; N, 13.2; S, 5.4. $C_{18}H_{18}N_5NaO_{10}S.1\frac{1}{2}H_2O$ requires C, 39.6; H, 3.9; N 12.8; S, 5.9%), $R_f$ 0.12.

Example 24 (X=CN; Y=H)

A solution of 3-acetoxymethyl-7-azidoacetamidoceph-3-em-4-carboxylic acid (0.50 g., 1.41 mmole.) (containing the 7-bromoacetamido-compound as an impurity) in dioxan (5 ml.) was added to cyanoacetylene (0.17 g., 3.35 mmole.), and the mixture was stored in the dark under nitrogen for 66 hr. at 25°. A further portion of cyanoacetylene (0.17 g.) was added and the mixture was kept for a further 40 hr. at 37°, and then evaporated. The residue was dissolved in ethyl acetate, and acidic material was extracted into saturated aqueous sodium hydrogen carbonate solution. The alkaline extract was acidified to pH 2, and extracted with ethyl acetate. Evaporation of this extract and trituration of the residue (0.47 g.) with warm acetone (15 ml.) gave a pink solid (46 mg.), $\lambda_{max}.(H_2O; pH6)$ 260-263 m$\mu$ ($E_{1cm}^{1\%}$ 207). The filtrate was treated with excess of a 10%-solution of sodium 2-ethylhexanoate in acetone, and ether (ca. 3 volumes) was added to precipitate an off-white solid. This solid was centrifuged off, washed with ether and dried (0.20 g.), $\lambda_{max}.(H_2O, pH6)$ 259-260 m$\mu$ ($E_{1cm}^{1\%}$ 201) (Found: Br. 1.4%), $R_f$ 0.22. Determinations of the infrared and p..m.r. spectra of the product, together with the analytical data, indicate it to be sodium 3-acetoxymethyl-7-(4'-cyano-1',2',3'-triazol-1'-ylacetamido)-ceph-3-em-4-carboxylate containing the sodium salts of the 7-azidoacetamido- and 7- bromoacetamido-3-acetoxymethylceph-3-em-4-carboxylic acids.

Examples 25 & 26

Addition of olefins to esters of 3-azidomethyl-7-phenylacetamidoceph-3-em-4-carboxylic acid

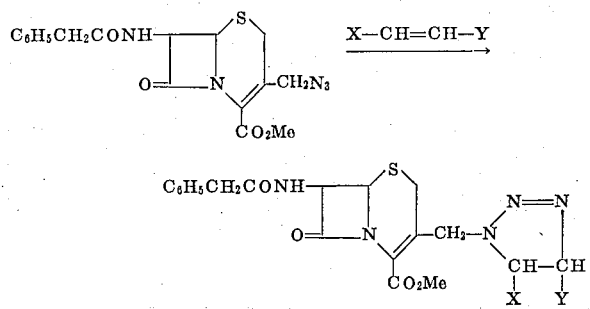

Example 25 (X=Y =CO₂Me)

A mixture of 3-azidomethyl-4-methoxycarbonyl-7-phenylacetamidoceph-3-em (0.5 g., 1.29 mmoles.) and dimethyl fumarate (0.21 g., 1.45 mmoles.) in dry toluene (5 ml.) was heated on the steam bath for 4 hr. Infrared specta of the samples taken at 0.5 hr. and 4 hr. showed ca. 50 percent and 25 percent respectively of the azide remaining. More dimethyl-fumarate (0.095 g., 0.65 mmoles.) was added, and heating was continued for 2 hr. The reaction mixture was evaporated to a yellow foam (0.71 g.). This was redissolved in a mixture of ethyl acetate and benzene (1:1, 20 ml.), and chromatographed on a column of silica gel (30 g.). Elution with ethyl acetatebenzene mixtures gave, first, dimethyl fumarate, m.p. 94°–97°, and then 4,5-dimethoxycarbonyl-1-(4'-methoxycarbonyl-7'-phenylacetamidoceph-3'-em-3'-ylmethyl)-1,2,3-triazoline (0.2 g.), $\lambda_{max.}$ (EtOH) 268–270 m$\mu$ (E$_{1cm.}^{1\%}$ 196), $\nu_{max.}$(CHBr₃) 1782 ($\beta$-lactam), 1738 and 1230 cm⁻¹ (strong-CO₂CH₃) (Found: N, 11.85; S, 5.6, N:S =4.8:1, C₂₅H₂₅N₅O₈S requires N, 13.2; S, 6.0%, N:S =5:1).

Example 26 (X,Y =—CON(C₆H₅)CO—)

a)

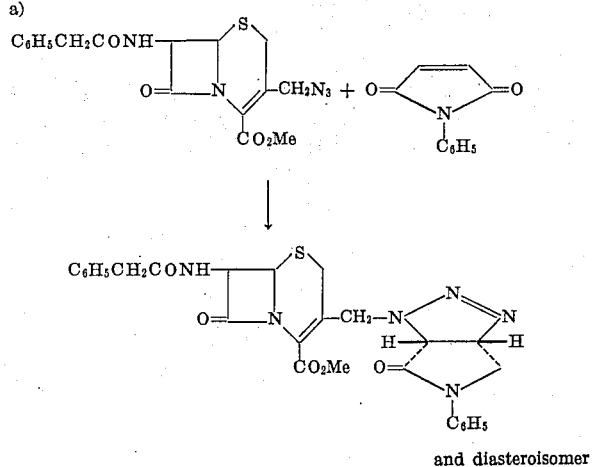

and diasteroisomer

A solution of 3-azidomethyl-4-methoxycarbonyl-7-phenylacetamidoceph-3-em (1.94 g., 5 mmoles.) and N-phenylmaleimide (0.87 g., 5 mmoles.) in dioxan (10 ml.) was heated at 98° for 17 hr. when the infrared spectrum of a sample showed no azide remaining. The reaction mixture was evaporated and the residual foam [t.l.c. in ethyl acetate-benzene (1:1) showed four spots, R$_f$ 0.31, 0.40, 0.55 (weak), 0.64 (weak)] was subjected to dry-column chromatography on silica gel (Whatman Chromedia SG 31 deactivated by addition of 3 percent water, 350 g.) with ethyl acetate-benzene (1:1) to develop the column. Elution with the same mixture gave traces of 3-azidomethyl- and 3-acetoxymethyl-4-methoxycarbonyl-7-phenylacetamidoceph-3-em (the latter as an impurity in the starting material), followed by a series of pale yellow oils which partly solidified on standing. Final elution was achieved with ethyl acetate. The earlier fractions (0.76 g.) were recrystallised from acetone to give a white solid ( 0.29 g., 10%), m.p. 173°–176°, part (182 mg.) of which was recrystallised from acetone to give (+) 1-phenylsuccinimido-[cis-3,4-d]-1-(4'methoxycarbonyl-7'-phenylacetamidoceph-3'- em-3'-ylmethyl)-1H-1,2,3-triazoline (125 mg.), m.p. 179°–181° (dec.), [$\alpha$]$_D^{26.5}$ + 310° (c 0.61; dimethylsulphoxide), $\lambda$max. (EtOH) 248–250 m$\mu$ ($\epsilon$20,300), $\nu$ max. (Nujol) 1800 ($\beta$-lactam), 1732

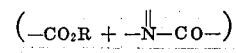

and 1688 and 1550 cm.⁻¹ (—CONH—) (Found: C, 58.2; H, 4.45; N, 15.2; S, 5.7. C₂₇H₂₄N₆O₆S requires C, 57.85; H, 4.3; N, 15.0; S, 5.7%); t.l.c. in ethyl acetate-benzene (1:1), R$_f$ 0.53. The later fractions (1.30 g.) were crystallised from acetone to give the corresponding (—) diastereoisomer (0.59 g., 19%), m.p. 198°–199° (dec.), $\alpha$]$_D^{25}$ - 189° (c 0.58; dimethylsulphoxide), $\lambda$max. (EtOH) 248–250 m$\mu$ ($\epsilon$ 20,600), $\nu$ max. (Nujol) 1782 ($\beta$-lactam), 1735 (—CO₂R), 1718

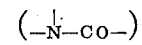

and 1660 and 1540 cm.⁻¹ (-CONH-) (Found: C, 57.65, 57.5; H, 4.8, 4.2; N, 15.0; S, 5.65%); t.l.c. in ethyl acetate-benzene (1:1), R$_f$ 0.44.

b. Expulsion of Nitrogen from a Triazoline

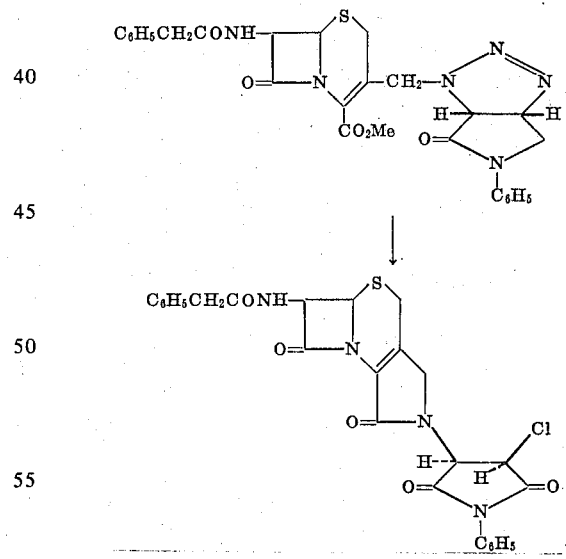

(—) 1-Phenylsuccinimido-[cis-3,4-d]-1-(4'-methoxycarbonyl-7'-phenylacetamidoceph-3'-em-3'-ylmethyl)-1H-1,2,3-triazoline (200 mg., 0.36 mmoles.) was dissolved in warm dioxan (40 ml.), and the solution was cooled to 20°. 0.4 N Hydrochloric acid (2 ml.) was added, and the change in [$\alpha$]$_D$ of the 0.475% solution was followed.

| Time in min. | 7 | 40 | 120 |
|---|---|---|---|
| [$\alpha$]$_D$ | ~−50° | +104° | +130° |

After 2 hr. had elapsed, the solvent was evaporated and the residue was triturated with acetone (10 ml.) to give a white solid (92 mg.), m.p. > 270°, $[\alpha]_D^{27}$ +137° (c 0.58; dimethylsulphoxide), $\lambda$ (EtOH) 260 m$\mu$ ($E_{1cm.}^{1\%}$ 137), $\nu$ max. (Nujol) 1780 ($\beta$-lactam), 1730

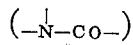

and 1695 cm.$^{-1}$ ($\gamma$-lactam). A second crop (28 mg.), $[\alpha]_D^{27.5}$ + 140° (c 0.56; dimethylsulphoxide) was obtained from the filtrate. Recrystallisation of part (35 mg.) of the first crop from acetone gave cis-3-(4'-carboxy-7'-phenyl-acetamidoceph-3'-em-3'-ylmethyl)-amino-4-chloro-1-phenyl-succinimide $\gamma$-lactam monohydrate (15.5 mg.) (Found: C, 56.1, 56.1; H, 4.45, 4.1; Cl, 5.8; N,9.8, 9.7; S, 5.8. $C_{26}H_{21}ClN_4O_5S \cdot H_2O$ requires C, 56.3; H, 4.2; Cl, 6.4; N, 10.1; S, 5.8%).

Example 27

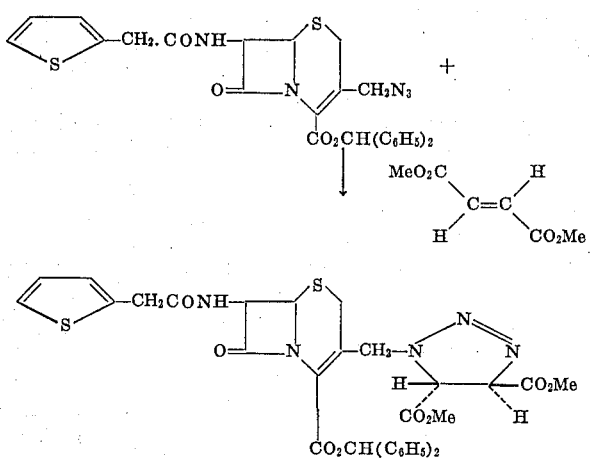

A solution of 3-azidomethyl-4-diphenylmethoxycarbonyl-7-(2'-thienylacetamido)-ceph-3-em (5.46 g., 10 mmoles.) and dimethyl fumarate (1.44 g., 10 mmoles.) in dioxan was stored in the dark at room temperature for 28 days when the infrared spectrum of a sample showed ca. 30 percent of the azide remaining. The reaction mixture was evaporated and the residue was dissolved in methylene dichloride and chromatographed on a column of silica gel (Whatman Chromedia SG 31, 450 g.). Elution with methylene dichloride-acetone (96:4) gave unchanged azide (2.21 g., 40.5%); elution with acetone gave a yellow foam (2.81 g.). This foam was dissolved in ethyl acetate (15 ml.) and the solution was added dropwise to rapidly stirred petroleum ether (40°–60°, 200 ml.) to precipitate trans-4,5-dimethoxycarbonyl-1-(4'-diphenylmethoxycarbonyl-7'-(2''-thienylacetamido)ceph-3'-em-3'-ylmethyl)-1H-1,2,3-triazoline as a cream powder (2.24 g., 32.5%), $[\alpha]_D$ — 11° (c 1.21; CHCl$_3$), $\lambda$max. (EtOH) 268–269 m$\mu$ ($E_{1cm.}^{1\%}$ 125), $\lambda$ (inflexion) 235 m$\mu$ ($E_{1cm.}^{1\%}$ 200), $\nu$max. (CHBr$_3$) 1780 ($\beta$-lactam) and 1740 cm$^{-1}$ (-CO$_2$R) (Found: C, 57.9, 57.3; H, 5.0, 4.75; N, 9.8, 9.9; S, 8.1, N:S = 2.8:1. $C_{33}H_{31}N_5O_8S_2$ requires C, 57.5; H, 4.5; N, 10.15; S, 9.3%, N:S = 2.5:1). A second crop (1.23 g., 18%), $\lambda$max. (EtOH) 269–270 m$\mu$ ($E_{1cm.}^{1\%}$ 136), was obtained from the filtrate.

Example 28

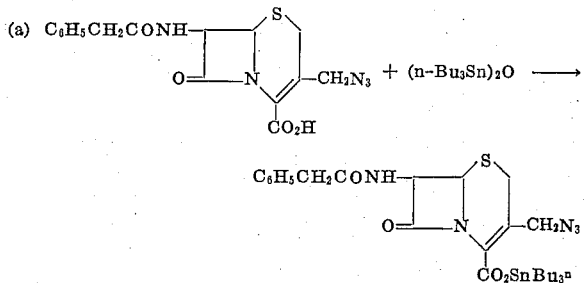

A suspension of 3-azidomethyl-7-phenylacetamidoceph-3-em-4-carboxylic acid (3.73 g., 10 mmoles.) in tri-n-butyltin oxide (3.0 ml., ca. 1.2 equiv.) and dry benzene (50 ml.) was heated under reflux for 10 min., by which time all the solid had dissolved. The water formed was removed by azeotropic distillation and more dry benzene (30 ml.) was added. The solution was reheated to boiling, filtered and evaporated to ca. 10 ml. Addition of hexane (15 ml.) to the cold solution precipitated tri-n-butyltin 3-azidomethyl-7-phenylacetamidoceph-3-em-4-carboxylate as cream crystals (4.18 g., 63%), m.p. 159°–164°, $[\alpha]_D$ + 41° (c, 0.95; dioxan), $\lambda$max. (EtOH) 264–265 m$\mu$ ($E_{1cm.}^{1\%}$ 118), $\nu$max. (Nujol) 1660 cm.$^{-1}$ (—CO$_2$SnR$_3$), part (0.21 g.) of which was recrystallised from benzene-petroleum ether (b.p. 40°–60°) to give crystals (0.155 g.), m.p. 160°–163° (Found: C, 51.1; H, 6.2; N, 10.35. $C_{28}H_{41}N_5O_4SSn$ requires C, 50.8; H, 6.2; N, 10.6%).

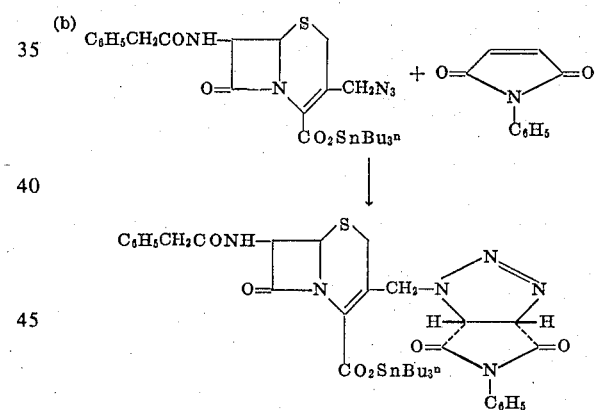

A solution of tri-n-butyltin 3-azidomethyl-7-phenylacetamidoceph-3-em-4-carboxylate (3.31 g., 5 mmoles.) and N-phenyl-maleimide (0.87 g., 5 mmoles.) in dioxan (10 ml.) was heated at 98° for 17 hr. when the infrared spectrum of a sample showed no azide remaining. The dioxan was evaporated and the residual foam was dissolved in ethanol (50 ml.), and acetic acid (0.5 ml.) was added. After 1 hr. at 20°, the clear solution was evaporated and the residue was triturated with benzene to give a cream solid (0.28 g.), $\lambda$ (EtOH) 260 m$\mu$ ($E_{1cm.}^{1\%}$ 146), $\nu$max. (Nujol) 1780 ($\beta$-lactam) and 1728 cm.$^{-1}$

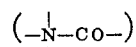

which showed ca. 15 percent of the activity of 3-acetoxymethyl-7-phenylacetamidoceph-3-em-4-carboxylic acid when screened against a penicillin sensitive *S.aureus* strain.

Example 29 a. HO·CO·C ≡ C·CO·OH → Bu₃ⁿSnO·CO·C ≡ C·CO·OSnBu₃ⁿ

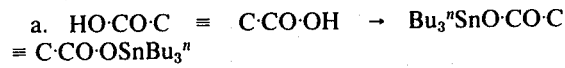

A mixture of acetylenedicarboxylic acid (0.57 g., 5 mmoles.), tri-n-butyltin oxide (3.0 ml., 5.85 mmoles.) and dry benzene (ca. 50 ml.) was refluxed for 1 hr., and then most of the solvent was removed by distillation. More dry benzene (50 ml.) was added and the mixture was refluxed for a further 30 min., and filtered from a mixture of unchanged dicarboxylic acid and tin ester (0.93 g.). The bis(tri-n-butyltin) ester (1.60 g., 46%), m.p. 172°–175°, separated from the filtrate on cooling. Part (200 mg.) was recrystallised from boiling benzene (10 ml.) to give acetylenedicarboxylic acid bis(tri-n-butyltin) ester (97 mg.), m.p. 186.5°–187° (dec.), $\nu$max. (Nujol) 1580 cm.$^{-1}$ (—COOSnR₃) (Found: C, 47.7; H, 8.2. C₂₈H₅₄O₄SN₂ requires C, 48.6; H, 7.9%).

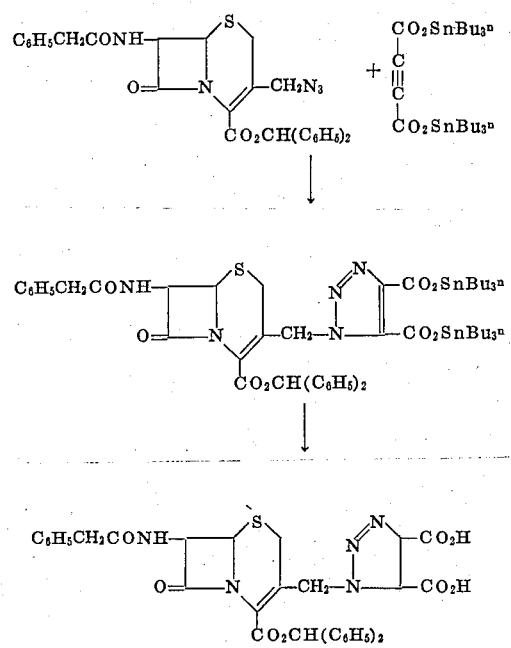

A mixture of 3-azidomethyl-4-diphenylmethoxycarbonyl-7-phenylacetamidoceph-3-em (540 mg., 1 mmole.), acetylenedicarboxylic acid bis(tri-n-butyl)tin ester (692 mg., 1 mmole.) and dioxan (10 ml.) was heated at 98° for 39 hr., not all the tin ester being in solution. The infrared spectrum of a sample showed ca. 10 percent of unchanged azide remaining. The mixture was filtered and the solvent was evaporated. The residue was dissolved in ethanol (20 ml.) and acetic acid (0.5 ml.) was added. After 2 hr. at 20°, the solvent was evaporated, the residue was dissolved in ethyl acetate, and the acidic fraction (46 mg.) was isolated by extraction into 4 percent aqueous sodium hydrogen carbonate solution and re-extraction at pH 1.5 with ethyl acetate. It was probably the triazoledicarboxylic acid with the structure shown in the heading.

Example 30

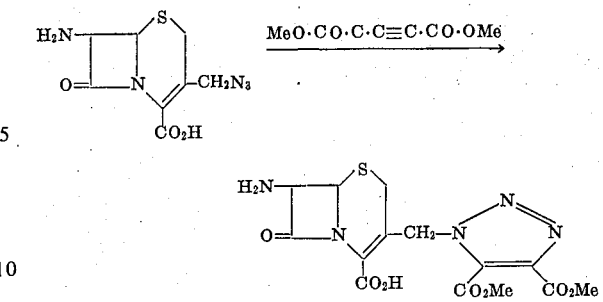

Tri-n-butyltin oxide (5.0 ml., 10.9 mmoles.) was added to a suspension of 7-amino-3-azidomethylceph-3-em-4-carboxylic acid (5.10 g., 20 mmoles.) in dry, refluxing toluene (100 ml.). The mixture was refluxed for 10 min., the water distilling azeotropically being collected in a Dean-Stark trap. All the solid dissolved. Dimethyl acetylene-dicarboxylate (5.68 g., 40 mmoles.) in dry toluene (30 ml.) was added, and refluxing was continued for 1.5 hr., when the infrared spectrum of a sample showed only 5 percent of unchanged azide remaining. The cold reaction mixture was extracted with saturated aqueous sodium hydrogen carbonate solution (3 × 10 ml.; 1 × 5 ml.) and water (1 × 20 ml.). The combined aqueous extracts were acidified to pH 1.5 and the precipitated solid was filtered off, washed with ethyl acetate (4 × 200 ml.), and dried to give a buff powder (1.75 g., 22%). This powder was suspended in acetone (50 ml.) and a solution of toluene-p-sulphonic acid monohydrate (1.10 g., 5.8 mmoles.) in acetone was added with stirring. After 10 min. had elapsed, the mixture was filtered and the filtrate was cooled to −60° for 15 min. when a white solid separated. The mixture was allowed to warm to 20°, the supernatant liquid was decanted, and the solid was washed by decantation with acetone (6 × 100 ml.), filtered off, washed with ether and dried to give 1-(7'-amino-4'-carboxyceph-3'-em-3'-ylmethyl)-4,5-bismethoxycarbonyl-1H-1,2,3-triazole toluene-p-sulphonate (0.60 g., 5.2%). This salt was dissolved in N,N-dimethylacetamide (1.5 ml.) and water (100 ml.) was added with stirring to precipitate the free amino-acid, which was filtered off, washed with water and dried (0.33 g., 4.1%), λmax. (pH 6) 238–239 mμ ($E_{1cm.}^{1\%}$ 295). A further, similar purification via the toluene-p-sulphonate salt gave 1-(7'-amino-4'-carboxy-ceph-3'-em-3'-ylmethyl)-4,5-dimethoxycarbonyl-1H-1,2,3-triazole (0.14 g.), λmax. (pH 6) 239 mμ (ε 11,550), $\nu$max. (Nujol) 1802 (β-lactam), 1740-1730 (—CO₂R) and 1550 cm.$^{-1}$ (-CO₂⁻) (Found: C, 41.7; H, 3.8; N, 17.8; S, 8.1 C₁₄H₁₅N₅O₇S requires C, 42.3; H, 3.8; N, 17.6; S, 8.1%).

Example 31

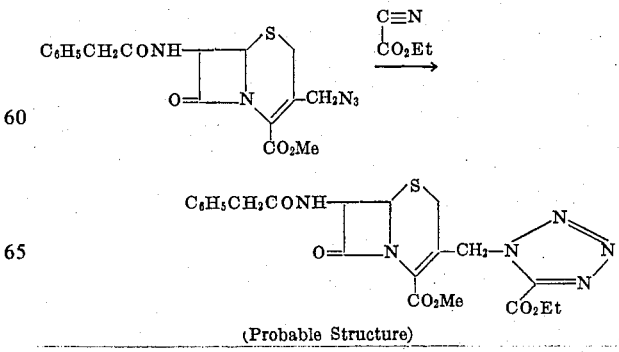

(Probable Structure)

A solution of 3-azidomethyl-4-methoxycarbonyl-7-phenylacetamidoceph-3-em (0.78 g., 2 mmoles.) in ethyl cyanoformate (2.5 ml.) was heated at 120° for 23 hr. when the infrared spectrum of a sample showed <5 percent azide remaining. The solution was evaporated to give a red foam (1.13 g.), t.l.c. in benzene-ethyl acetate (1:1 $R_f$ 0.45, 0.50 (weak), 0.57, 0.61, 0.68. The major product $R_f$ 0.45, which was probably the tetrazole with the structuree shown in the heading, was isolated in 10% yield by dry column chromatography on deactivated silica gel.

The following examples ilustrate some pharmaceutical preparations according to the invention:

EXAMPLE A

Ointment

| | parts by weight |
|---|---|
| Sodium 4,5-dicyano-1-(4'-carboxy-7'-[2''-thienylacetamido]-ceph-3'-em-3'-ylmethyl)-1,2,3-triazole | 5 |
| Wool alcohols B.P. | 5 |
| Liquid Paraffin | 12.5 |
| Yellow soft paraffin ad | 100 |

The active ingredient was finely dispersed in some of the liquid paraffin in a ball mill. The wool alcohols and the yellow soft paraffin were melted together to about 55°C. The dispersion of the active ingredient was added using the remainder of the liquid paraffin. The mixture was stirred and cooled until the ointment set before transfering to a suitable container.

EXAMPLE B

Injection

Sterile sodium 4,5-dicyano-1-(4'-carboxy-7'-[2''-thienylacetamido]-ceph-3'-em-3'-ylmethyl)-1,2,3-triazole was distributed aseptically into vials, each containing 250 mg., and sealed to exclude moisture and bacteria the material was dissolved before use by the addition of sterile water to produce a 2 ml. injection.

EXAMPLE C

Long Acting veterinary cerate

| | |
|---|---|
| Sodium 4,5-dicyano-1-(4'-carboxy-7'-[2''-thienylacetamido]-ceph-3'-em-3'-ylmethyl)-1,2,3-triazole | 100 mg. |
| Aluminium stearate (29% w/w gel in liquid paraffin) ad | 3 gms. |

The gel base was prepared in a conventional manner. The active material was finely powdered and dispersed in the base to give a homogeneous mix preferably using a colloid mill.

Biological results of some of the compounds are shown in the following table. The Staph. aureus Strains A, C and D were penicillin resistant while Strain B was penicillin sensitive. The abbreviation s.c. = subcutaneous.

We claim:

1. A compound selected from the group consisting of a compound of the formula

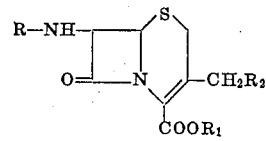

wherein R is selected from the group consisting of H and an acyl radical selected from the group consisting of

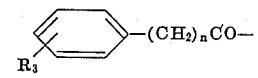

where $R_3$ is H, F, or acetoxy and $n$ is an integer from 1–4,

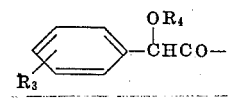

where $R_3$ has the meaning given above and $R_4$ is H, acetyl or formyl,

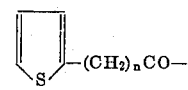

where $n$ has the meaning given above, $C_mH_{2m+1}CO-$ where $m$ is an integer from 1–7, $CH_3SCH_2CO-$,

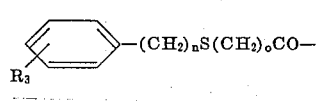

Table 3

| | Tube Dilution Assay (γ/ml) | | | | | | | | Mouse Protection Tests | |
|---|---|---|---|---|---|---|---|---|---|---|
| | Gram-positive | | | | Gram-negative | | | | Route | $ED_{50}$ mg/kg/dose |
| Example No. | Staph. aureus Strain B | Staph. aureus Strain A | Staph. aureus Strain C | Staph. aureus Strain D | E. coli | Pr. vulgaris | S. typhimurium | Ps. pyocyanea | | Staph. aureus Strain B | E. coli |
| 5 | 0.08 | 2.5 | 16 | | 62 | 31 | 31 | >250 | s.c. | 5 | >50 |
| | | | | | | | | | oral | 10 | |
| 6 | 0.08 | 1.25 | 8 | — | 16 | 4 | — | >250 | s.c. | 2.5 | >50 |
| 7 | 0.3 | 1.25 | 4 | — | 125 | 31 | 250 | >250 | s.c. | 15 | >50 |
| 8 | 0.04 | 2.5 | <0.5 | — | >250 | 125 | — | >250 | s.c. | 4 | >50 |
| 9 | 0.08 | 2.5 | 8 | — | >250 | >250 | >250 | >250 | s.c. | >50 | >50 |
| 10 | 1.25 | 1.25 | 31 | 4 | 125 | >250 | 250 | >250 | s.c. | 9 | — |
| 11 | 0.62 | >2.5 | 16 | 2 | 16 | >250 | >250 | >250 | s.c. | — | — |
| 12 | 0.6 | 2.5 | 16 | 4 | 125 | 62 | 125 | >250 | s.c. | >50 | — |
| 13 | 0.31 | 1.25 | 8 | 2 | 16 | <8 | 31 | >250 | s.c. | <25 | >100 |
| 14 | 0.31 | 1.25 | 16 | <0.5 | 250 | 250 | >250 | 125 | s.c. | — | > |
| 15 | 0.31 | 2.5 | 8 | 16 | 125 | 62 | >250 | >250 | s.c. | ~25 | — |
| 16 | 1.25 | >2.5 | 16 | 31 | 62 | 62 | 62 | 62 | s.c. | 40 | >100 |
| 17 | 0.3 | 2.5 | 16 | 2 | 125 | 125 | 125 | >250 | s.c. | >50 | — |
| 18 | 0.04 | 2.5 | 31 | — | >250 | >250 | >250 | 250 | s.c. | >50 | >50 |
| 19 | 0.08 | 2.5 | 16 | — | 125 | 125 | 62 | 125 | s.c. | 10 | 50 |
| 20 | 0.08 | 2.5 | 8 | — | 250 | 62 | 250 | 250 | s.c. | 2.5 | 50 |
| 21 | 0.04 | 1.25 | 4 | — | <4 | <4 | <4 | 62 | s.c. | 35 | ~50 |
| 22 | 0.08 | 0.31 | <0.5 | — | <4 | 4 | 16 | 125 | s.c. | 19 | >50 |
| 24 | 0.31 | 1.25 | 8 | — | 31 | 16 | 16 | >250 | — | — | | where $R_3$ and n have the meanings given above and o is an integer from 1–5,

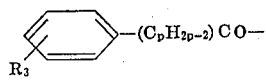

where $R_3$ has the meaning given above and p is an integer from 2–7,

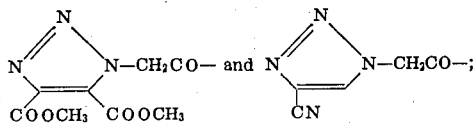

$R_1$ is selected from the group consisting of H, Na-, —$CH_3$, —$CH_2C_6H_5$, —$CH(C_6H_5)_2$ and $SnBu_3{}^n$; and $R_2$ is selected from the group consisting of H, —$OCOCH_3$,

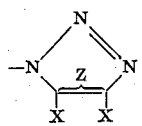

where X is H, —CH, —COOH, —$COOCH_3$, —$COOC_2H_5$ or —$COC_6H_5$ and Z indicates a single or a double bond,

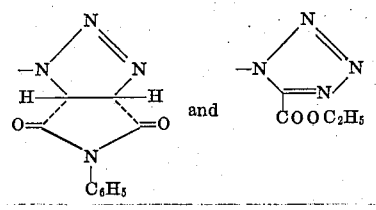

$R_2$ being H or —$OCOCH_3$ only when R is

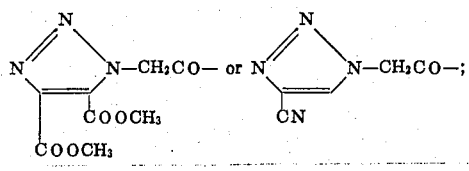

and the compound of the formula

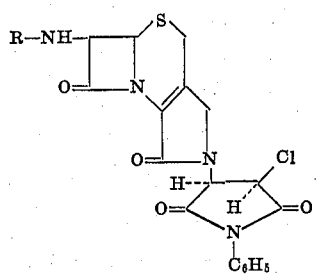

where R has the meaning given above.

2. A compound as defined in claim 1 wherein said compound has the formula

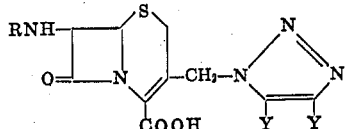

where the groups Y are selected from the group consisting of cyano and methoxycarbonyl groups.

3. The compound of claim 1 which is 4,5-dimethoxycarbonyl-1-(4'-carboxy-7'-phenylacetamidoceph-3'—em-3'-ylmethyl)-1,2,3-triazole

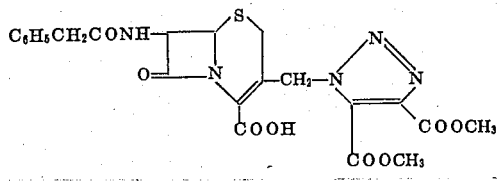

or a sodium salt thereof.

4. The compound of claim 1 which is 4,5-dimethoxycarbonyl-1-(4'-carboxy-7'-[2''-thienylacetamido] ceph-3'-em-3'-ylmethyl)-1,2,3-triazole

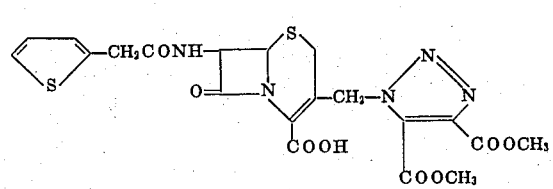

or a sodium salt thereof.

5. The compound of claim 1 which is 4,5-dimethoxycarbonyl-1-(4'-carboxy-7'-n-pentanamidoceph-3'-em-3'-ylmethyl)-1,2,3-triazole

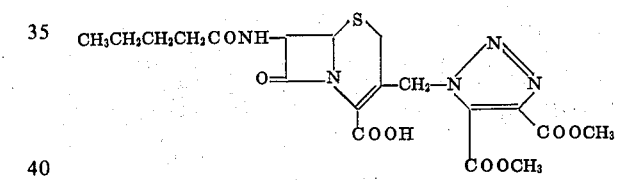

or a sodium salt thereof.

6. The compound of claim 1 which is 4,5-dimethoxycarbonyl-1-(4'-carboxy-7'-[α-benzylthioacetamido]-ceph-3'-em-3'-ylmethyl)-1,2,3-triazole

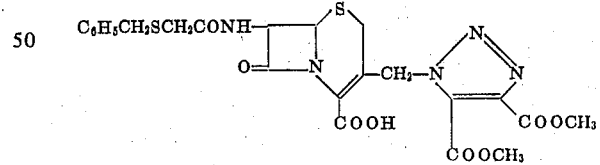

or a sodium salt thereof.

7. The compound of claim 1 which is 4,5-dimethoxycarbonyl-1-(4'-carboxy-7'-[5''-phenylpent-3''-enamido]-ceph-3'-em-3'-ylmethyl)-1,2,3-triazole

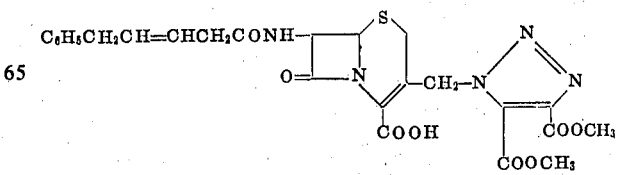

or a sodium salt thereof.

8. The compound of claim 1 which is 4,5-dimethoxycarbonyl-1-(4'-carboxy-7'-[D-α-Phenyl-α-acetoxyacetamido]-ceph-3'-em-3'-ylmethyl)-1,2,3-triazole

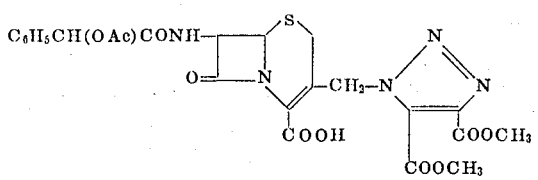

or a sodium salt thereof.

9. The compound of claim 1 which is 4,5-dimethoxycarbonyl-1-(4'-carboxy-7'-[D-α-phenyl-α-hydroxyacetamido]-ceph-3'-em-3'-ylmethyl)-1,2,3-triazole

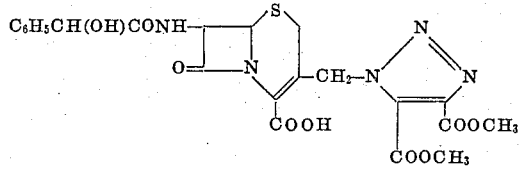

or a sodium salt thereof.

10. The compound of claim 1 which is 4,5-dimethoxycarbonyl-1-(4'-carboxy-7'-[methylthioacetamido]-ceph-3'-em-3'-ylmethyl)-1,2,3-triazole

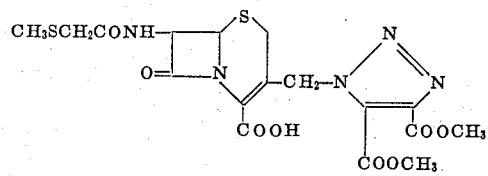

or a sodium salt thereof.

11. The compound of claim 1 which is 4,5-dimethoxycarbonyl-1-(4'-carboxy-7'-[D-α-phenyl-α-formyloxyacetamido]-ceph-3'-em-3'-ylmethyl)-1,2,3-triazole

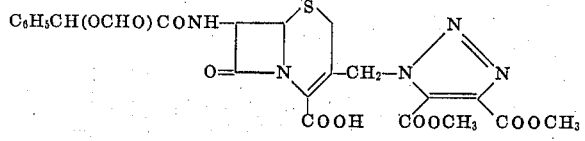

or a sodium salt thereof.

12. The compound of claim 1 which is 4,5-dimethoxycarbonyl-1-(4'-carboxy-7'-[4''-fluorophenylacetamido]-ceph-3'em-3'-ylmethyl)-1,2,3-triazole

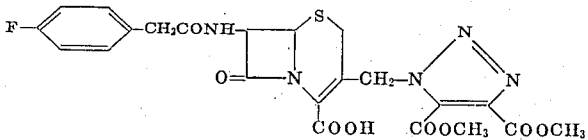

or a sodium salt thereof

13. The compound of claim 1 which is 4,5-dimethoxycarbonyl-1-(4'-carboxy-7'-[3''-fluorophenylacetamido]-ceph-3'-em-3'-ylmethyl)-1,2,3-triazole

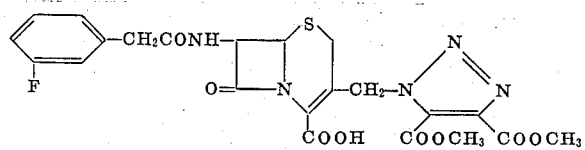

or a sodium salt thereof

14. The compound of claim 1 which is 4,5-dimethoxycarbonyl-1-(4'-carboxy-7'-[2''-fluorophenylacetamido]-ceph-3'-em-3'-ylmethyl)-1,2,3-triazole

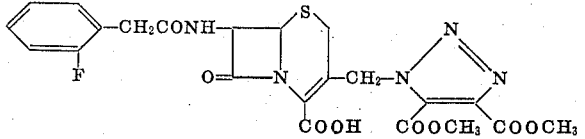

or a sodium salt thereof.

15. The compound of claim 1 which is 4,5-dimethoxycarbonyl-1-(4'-carboxy-7'-[4''-acetoxyphenylacetamido]-ceph-3'-em-3'-ylmethyl)-1,2,3-triazole

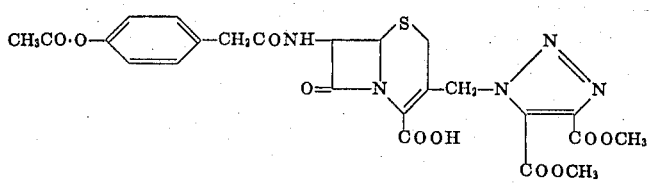

or a sodium salt thereof.

16. The compound of claim 1 which is 4,5-dibenzoyl- 1-(4'-carboxy-7'-phenylacetamidoceph-3'-em-3'-ylmethyl)-1,2,3-triazole

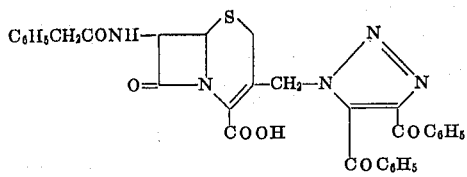

or a sodium salt thereof.

17. The compound of claim 1 which is 4-cyano-1-(4'-carboxy-7'-phenylacetamidoceph-3'-em-3'-ylmethyl)-1,2,3-triazole

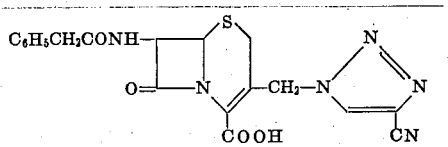

or a sodium salt thereof.

18. The compound of claim 1 which is 4- or 5-ethoxycarbonyl-1-(4'-carboxy-7'-phenylacetamidoceph-3'-em-3'-ylmethyl)-1,2,3-triazole

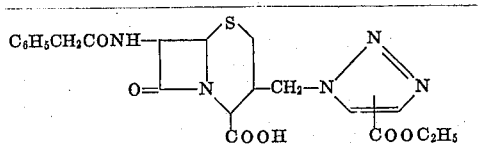

or a sodium salt thereof.

19. The compound of claim 1 which is 4,5-dicyano-1-(4'-carboxy-7'-phenylacetamidoceph-3'-em-3'-ylmethyl)-1,2,3-triazole

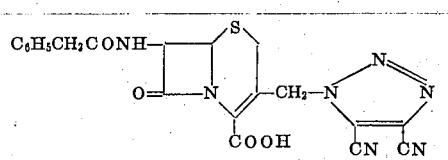

or a sodium salt thereof.

20. The compound of claim 1 which is 4,5-dicyano-1-(4'-carboxy-7'-[2''-thienylacetamido]-ceph-3'-em-3'-ylmethyl)-1,2,3-triazole

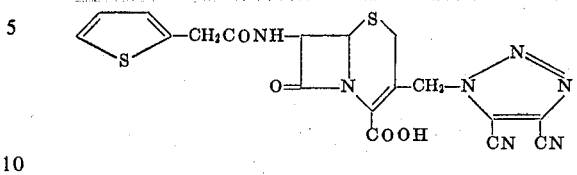

or a sodium salt thereof.

21. The compound of claim 8 which is 3-acetoxymethyl-7-(4',5'-dimethoxycarbonyl-1',2',3'-triazol-1'-ylacetamido)-ceph-3-em-4-carboxylic acid.

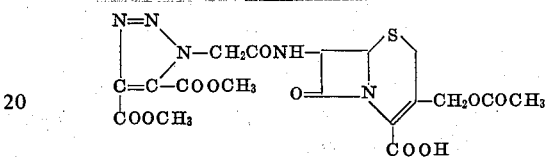

or a sodium salt thereof.

22. The compound of claim 1 which is 3-acetoxymethyl-7-(4'-cyano-1',2',3'-triazol-1'-ylacetamido)-ceph-3-em-4-carboxylic acid

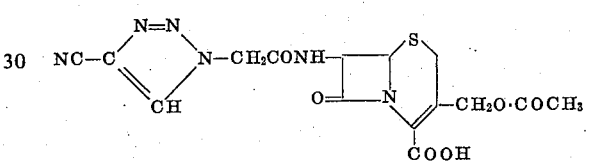

or a sodium salt thereof.

23. The compound of claim 1 which is (+) or (−) 1-phenylsuccinimido-(cis -3,4-d)-1-(4'-carboxy-7'-phenylacetamidoceph-3'-em-3'-ylmethyl)-1H-1,2,3-triazoline

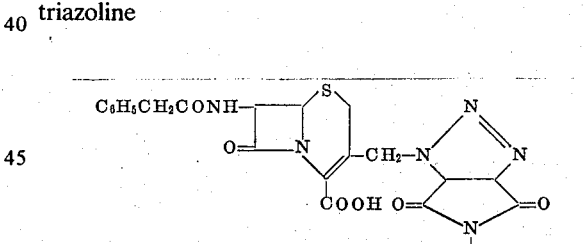

or a sodium salt thereof.

* * * * *